(12) United States Patent
Roozeboom

(10) Patent No.: US 10,392,197 B1
(45) Date of Patent: Aug. 27, 2019

(54) CONVEYOR ROLLERS THAT INCLUDE A FLOATING BEARING

(71) Applicant: Precision, Inc., Pella, IA (US)

(72) Inventor: Matthew Roozeboom, Pella, IA (US)

(73) Assignee: Precision, Inc., Pella, IA (US)

( * ) Notice: Subject to any disclaimer, the term of this patent is extended or adjusted under 35 U.S.C. 154(b) by 0 days.

(21) Appl. No.: 16/029,061

(22) Filed: Jul. 6, 2018

(51) Int. Cl.
 *B65G 39/09* (2006.01)

(52) U.S. Cl.
 CPC .................................. *B65G 39/09* (2013.01)

(58) Field of Classification Search
 CPC ....................................................... B65G 39/02
 USPC ............................................................ 193/37
 See application file for complete search history.

(56) References Cited

U.S. PATENT DOCUMENTS

| | | | | |
|---|---|---|---|---|
| 2,757,052 A | * | 7/1956 | Spurgeon ................. | F16C 33/78 277/353 |
| 3,511,350 A | * | 5/1970 | Vom Stein ........... | B65G 13/075 193/35 A |
| 4,325,473 A | * | 4/1982 | Garnett ................. | F16C 13/022 193/35 R |
| 4,326,619 A | * | 4/1982 | Garnett ................. | B65G 39/09 193/37 |
| 4,345,678 A | * | 8/1982 | Garnett ................. | B65G 39/09 193/35 R |
| 4,827,856 A | * | 5/1989 | Rohr ...................... | D05B 33/00 112/306 |
| 8,770,849 B2 | | 7/2014 | Couillard | |

OTHER PUBLICATIONS

COMPONEX, "Bearing FAQ", 4 pgs., retrieved from http://www.componex.net/faqs/bearings/, Apr. 13, 2018.
COMPONEX, "Thermal Expansion Prevention in Rollers—Self-Adjusting Idler Rollers", 4 pgs., retrieved from http://www.componex.net/tech-info/winertia-sa/, Apr. 13, 2018.
COMPONEX, "Self-Aligning Ball Bearings—Angular Contact Ball Bearings", 8 pgs., retrieved from http://www.componex.net/tech-info/winertia-self-adjusting-bearings/, Apr. 13, 2018.

* cited by examiner

*Primary Examiner* — William R Harp
(74) *Attorney, Agent, or Firm* — Armstrong Teasdale LLP

(57) ABSTRACT

Conveyor rollers that include a bearing that may float axially relative to the shaft are disclosed. In some embodiments, the conveyor roller includes an elastic member (e.g., o-ring) that resists rotation of the inner race of the bearing from rotating relative to the shaft. The floating bearing may accommodate expansion and/or contraction of the roller tube relative to the shaft.

17 Claims, 7 Drawing Sheets

CONVEYOR ROLLERS THAT INCLUDE A FLOATING BEARING

FIELD OF THE DISCLOSURE

The field of the disclosure relates to conveyor rollers and, in particular, conveyor rollers that include a floating bearing.

BACKGROUND

Conveyor rollers are conventionally used to transfer articles. The rollers may support a rotating belt that moves the articles or the rollers may directly support articles (e.g., gravity conveyors). The conveyor rollers may each include a tube which rotates about a shaft that extends through the tube. The shaft is connected to the conveyor frame. Bearings disposed toward each end of the shaft enable the tube to rotate about the shaft.

Conveyor rollers may be made of dissimilar materials to reduce cost or weight of the roller. For example, the tube may be made of a polymer material with the shaft being made of steel. Some dissimilar materials are characterized by different coefficients of thermal expansion. For example, polymers such as nylon and high-density polyethylene (HDPE) may have a coefficient of thermal expansion of about $50 \times 10^{-6}$ in/in/° F. and about $83 \times 10^{-6}$ in/in/° F., respectively. In contrast, steel may expand significantly less as it is characterized by a coefficient of thermal expansion of about $6.7 \times 10^{-6}$ in/in/° F.

For rollers made of such dissimilar materials, the components may expand and/or contract relative to each other over the course of a day due to daily temperature changes or may change in temperature due to variations in the weather. Further, the ambient in which the rollers operate may be significantly different (e.g., higher such as temperatures of 100° F. or more) than the temperature at which the rollers were assembled. The difference in expansion or contraction can cause stresses to form in the conveyor roller which may cause excessive axial loading on the bearings, thereby increasing rotational drag and/or reducing the life of the bearings; buckling of the tube; or undesired displacement of components (bearings moving in the end housings, end housings moving in the tube, etc.), thereby decreasing the lifetime of the conveyor roller.

A need exists for conveyor rollers that can accommodate expansion or contraction of conveyor components relative to other components This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a conveyor roller. The conveyor roller comprises a shaft and a floating bearing assembly. The floating bearing assembly comprises a bearing having an inner race through which the shaft extends and an outer race disposed around the inner race. One or more rolling elements are disposed between the inner race and the outer race to enable the outer race to rotate relative to the inner race. The conveyor roller comprises an elastic member disposed between the inner race and the shaft to resist movement of the inner race relative to the shaft. The conveyor roller comprises a center tube having an outer circumferential surface. The shaft is received in the center tube. The floating bearing assembly enables the center tube to rotate relative to the shaft.

Another aspect of the present disclosure is directed to a conveyor roller. The conveyor roller includes a shaft that defines a rotational axis. The conveyor roller comprises a floating bearing assembly that is free of fasteners that limit movement of the bearing assembly relative to the shaft in the axial direction. The floating bearing assembly is capable of moving relative to the shaft in the axial direction. The floating bearing assembly includes a bearing. The bearing has an inner race through which the shaft extends and an outer race disposed around the inner race. One or more rolling elements are disposed between the inner race and outer race to enable the outer race to rotate relative to the inner race. The conveyor roller comprises a center tube having an outer circumferential surface. The shaft is received in the center tube. The center tube rotates relative to the shaft about the rotational axis.

Yet another aspect of the present disclosure is directed to a conveyor roller. The conveyor roller includes a shaft that defines a rotational axis. The shaft is made of steel. A first bearing assembly is capable of moving relative to the shaft in an axial direction. A second bearing assembly is fixed relative to the shaft in the axial direction. The conveyor roller includes a center tube having an outer circumferential surface. The shaft is received in the center tube. The center tube is made of a polymer. The center tube rotates relative to the shaft about the rotational axis.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
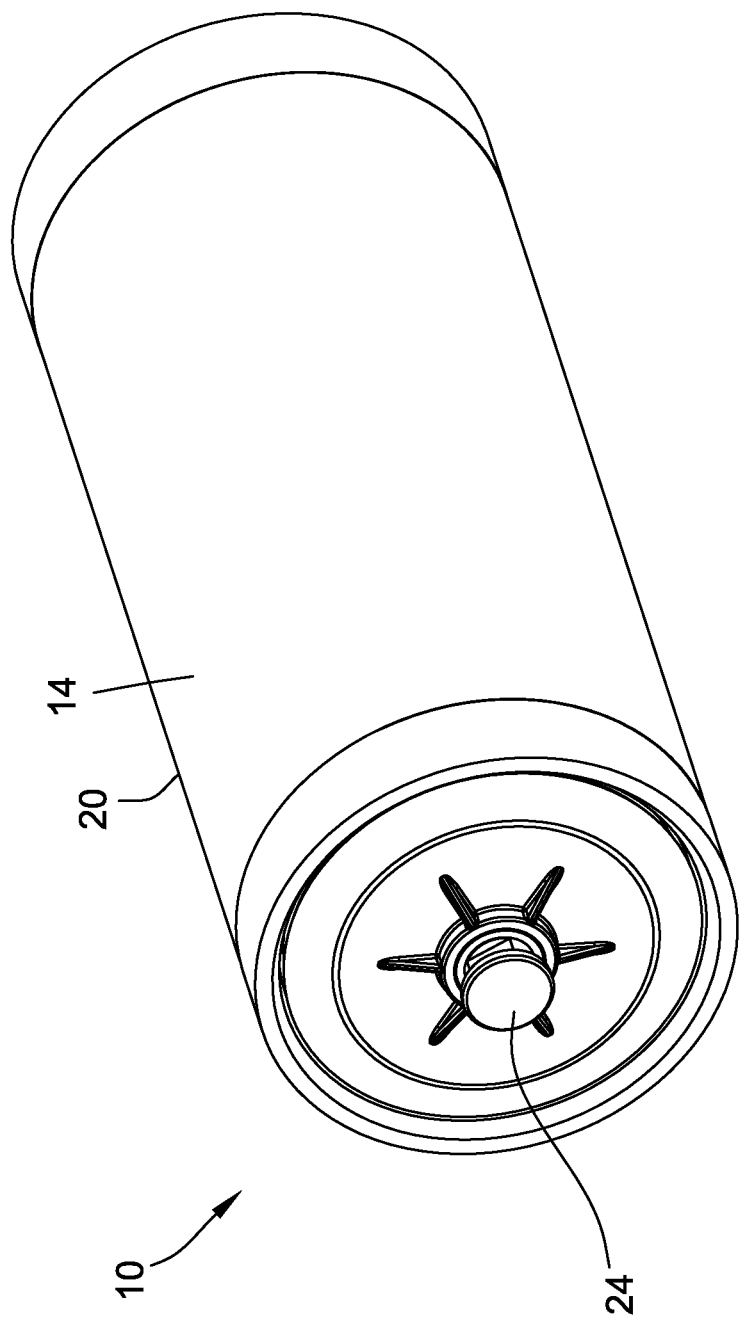
FIG. 1 is a perspective view of a conveyor roller.

An example conveyor roller 10 of the present disclosure is shown in FIG. 1. The conveyor roller 10 includes a center tube 14 which includes an outer circumferential surface 20 for contacting a belt or articles that pass over the tube. The conveyor roller 10 may be used to support a belt that is looped around a tail pulley and head pulley (i.e., to support the belt between the head pulley and tail pulley) or may be used to directly support articles without a belt (e.g., as in a gravity conveyor). Further, the roller 10 may also be used as a conveyor pulley which changes the direction of the belt. In some embodiments, the roller 10 is motorized and drives the belt (e.g., with a motor embedded within the roller).

Figure 2:
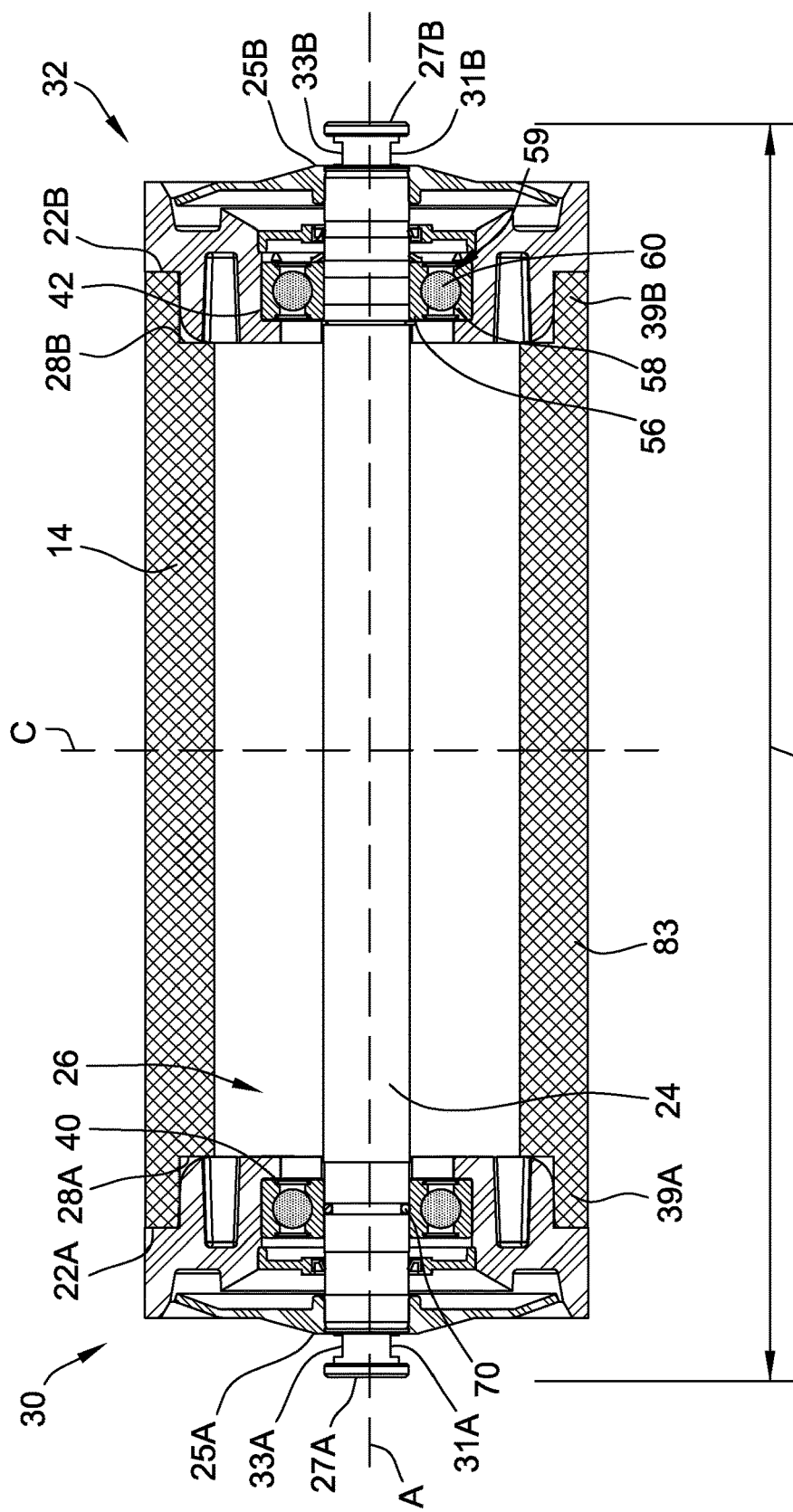
FIG. 2 is a cross-section front view of the conveyor roller.

The conveyor roller 10 is generally longitudinally symmetrical across its length in that several components have a corresponding component with the same function opposite the component (i.e., across a longitudinal mid-plane C (FIG. 2)). Corresponding components of the pair may be indicated herein by use of a reference number followed by "A" and "B" and may be referred to as a "first" component and a "second" component, respectively. While the conveyor roller 10 may be described herein with reference to the components of one side of the conveyor roller 10, any component designated by "A" or "B" herein or shown in FIGS. 1-7 includes a corresponding component with the same function opposite the component. Some components (e.g., shaft 24) are not longitudinally symmetrical.

The conveyor roller 10 includes a shaft 24 that is received in the center tube 14 and extends through the first and second ends 25A, 25B of the roller 10. The shaft 24 is a through-shaft that extends the length of the conveyor roller 10. In other embodiments, the roller 10 includes two stub shafts that each only partially extend in the center tube 14. The shaft 24 may be connected toward its first and second ends 27A, 27B to a conveyor frame (not shown). Generally, the shaft 24 may be connected to the frame in any suitable manner. The shaft 24 may include recesses 31A, 33A toward its first end 27A and recesses 31B, 33B toward is second end 27B into which frame members (not shown) are received to secure the shaft to a frame and prevent its rotation.

The roller 10 includes a first bearing assembly 30 and a second bearing assembly 32 that allow the center tube 14 to rotate relative to the shaft 24. The first bearing assembly 30 is able to move axially (i.e., along rotational axis A) relative to the shaft 24 (i.e., to "float" relative to the shaft 24). In the illustrated embodiment, the second bearing assembly 32 is fixed relative the shaft 24. In other embodiments, the second bearing assembly 32 is also able to float relative to the shaft 24 (e.g., is symmetrically identical to the first bearing assembly 30 and/or includes an elastic member disposed between the inner race of the second floating bearing and the shaft).

The first bearing assembly 30 includes a first bearing 40 and the second bearing assembly includes a second bearing 42. The first and second bearings 40, 42 enable the center tube 14 to rotate relative to the shaft 24. In the illustrated embodiment, the first and second bearings 40, 42 are identical and the components and functions of one bearing 40, 42 should be understood to apply to the second bearing. For example, in some embodiments, the width of the first bearing 40 is substantially equal to the width of the second bearing. In other embodiments, the bearing 40, 42 are dissimilar in one or more aspects (e.g., seals and/or locations thereof).

Figure 4:
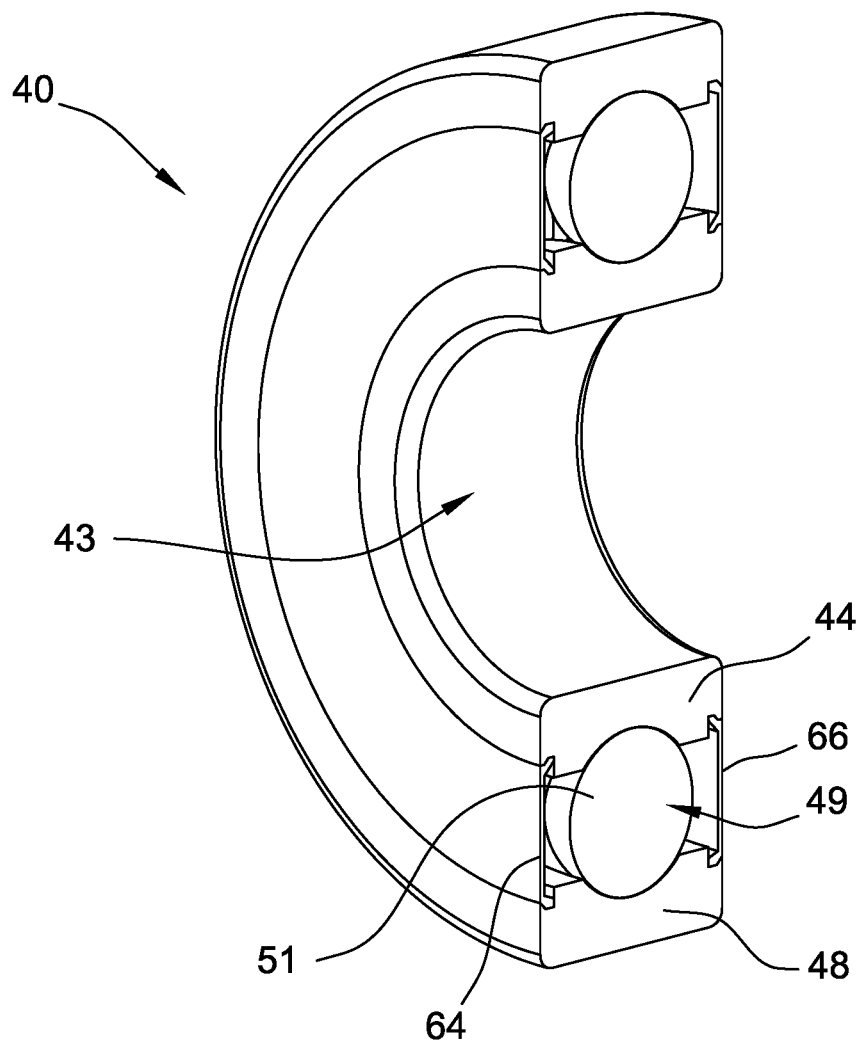
FIG. 4 is a cross-section perspective view of a bearing of the conveyor roller.
Figure 6:
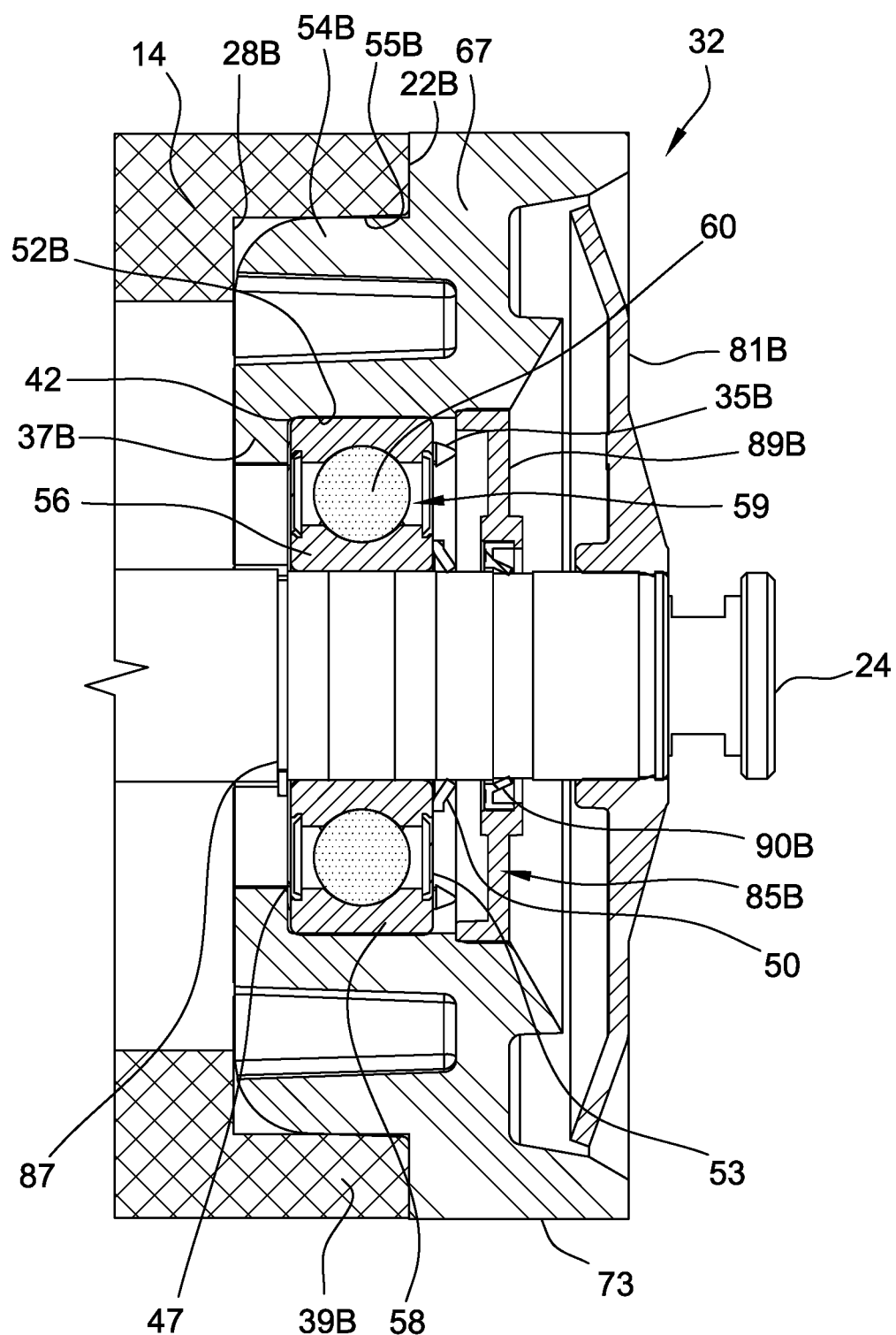
FIG. 6 is a cross-section front view of a fixed bearing assembly of the conveyor roller.

Referring now to FIG. 4, the first bearing 40 (FIG. 4) includes an inner chamber 43 through which the shaft 24 (FIG. 2) extends. The inner chamber 43 is defined by an inner race 44. An outer race 48 is disposed around the inner race 44. The inner and outer races 44, 48 form a channel 49 with rolling elements 51 being disposed in the channel 49. The rolling elements 51 allow the outer race 48 to rotate relative to the inner race 44. The rolling elements 51 may freely rotate within the channel 49 or may be held in place by rolling element cages. Referring now to FIG. 6, the second bearing 42 also includes an inner race 56, outer race 58, channel 59 and rolling elements 60. In some embodiments, the first and second bearings 40, 42 are identical and/or interchangeable.

The first and second bearings 40, 42 may be ball bearings as shown or other rolling elements (e.g. rollers) may be used. Other suitable bearings include cylindrical bearings, needle bearings, or spherical bearings. The bearings 40, 42 may be non-angular contact bearings as in the illustrated embodiments or may be angular contact bearings (e.g., tapered roller bearings).

The bearings 40, 42 are sealed bearings and each include first and second seals (first and second seals 64, 66 of the first bearing 40 being shown in FIG. 4). The bearings 40, 42 may be preloaded with a lubricant (e.g., grease or oil) such as a lubricant that is configured to be effective for at least the designed service of the bearing (i.e., the bearings are "lubed-for-life"). The first bearing 40 (FIG. 3) includes an inner side 41 and an outer side 38 and the second bearing 42 (FIG. 6) also includes an inner side 47 and outer side 53.

The first and second bearing assemblies 30, 32 each include assembly end housings 65, 67 (FIGS. 3 and 6), respectively, which may also be referred to as "end bells" or "end caps". The first bearing 40 is deposed within the first bearing assembly housing 65 and the second bearing 42 is disposed within the second bearing assembly housing 67. In the illustrated embodiment, the assembly end housings 65, 67 include outer circumferential surfaces 71, 73 that contact the belt or articles carried by the roller 10. In other embodiments, the assembly end housings 65, 67 are fully embedded within the center tube 14 such that only the center tube 14 contacts the belt or articles.

The center tube 14 includes a first end 22A (FIG. 2) and a second end 22B. The center tube 14 defines a center tube chamber 26. The center tube 14 is counter-bored to include two outer sections 39A, 39B and an inner section 83 with the outer sections 39A, 39B having a larger inner diameter than the inner section 83. Each outer section 39A, 39B forms a shoulder 28A, 28B (FIGS. 3 and 6) with the inner section 83 which acts as a stop while positioning the first and second bearing assembly end housings 65, 67 into the tube 14. In some embodiments, the end housings 65, 67 are spin-welded to the center tube 14 (e.g., continuously around the circumference).

Figure 3:
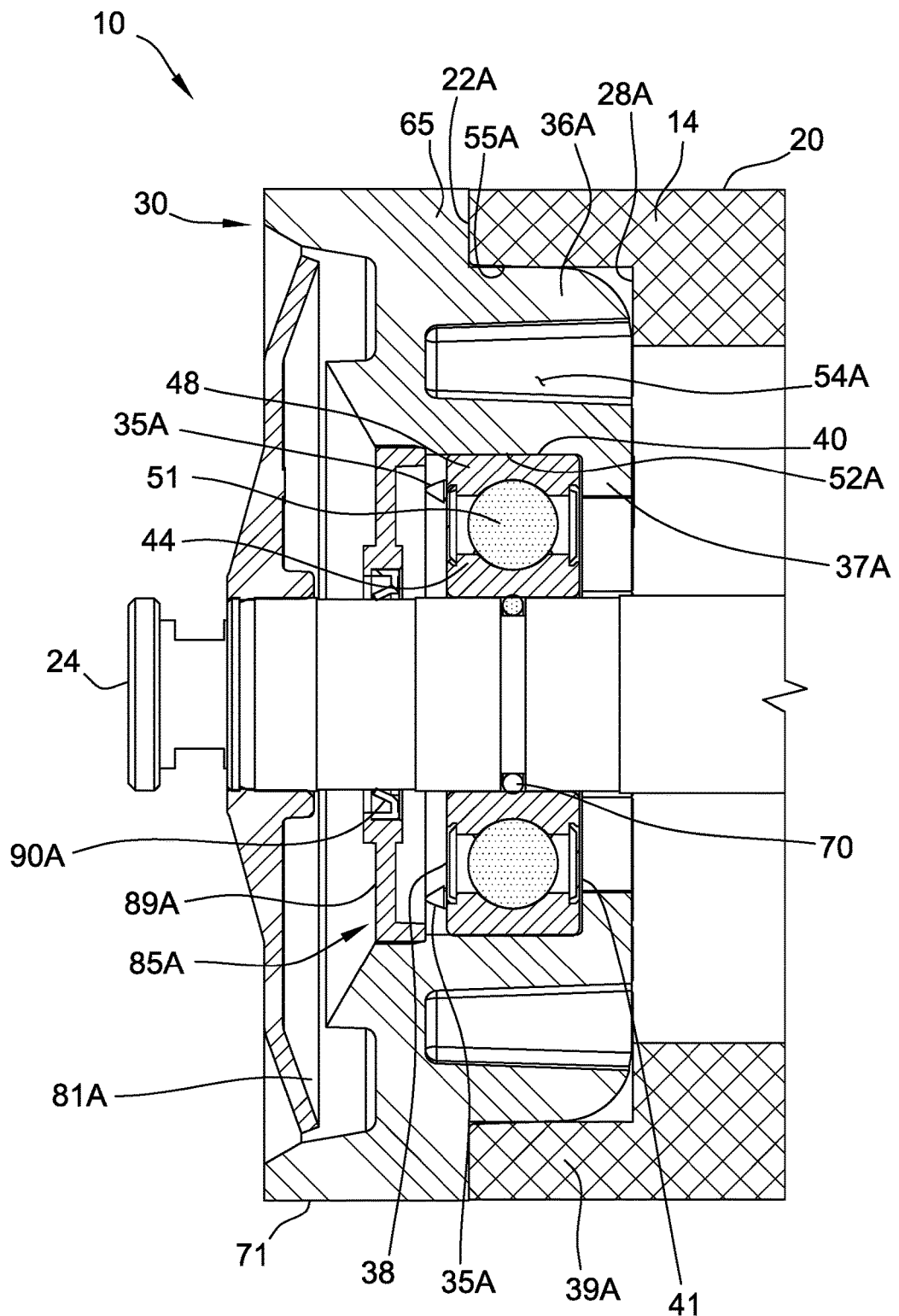
FIG. 3 is a cross-section front view of a floating bearing assembly of the conveyor roller.
Figure 7:
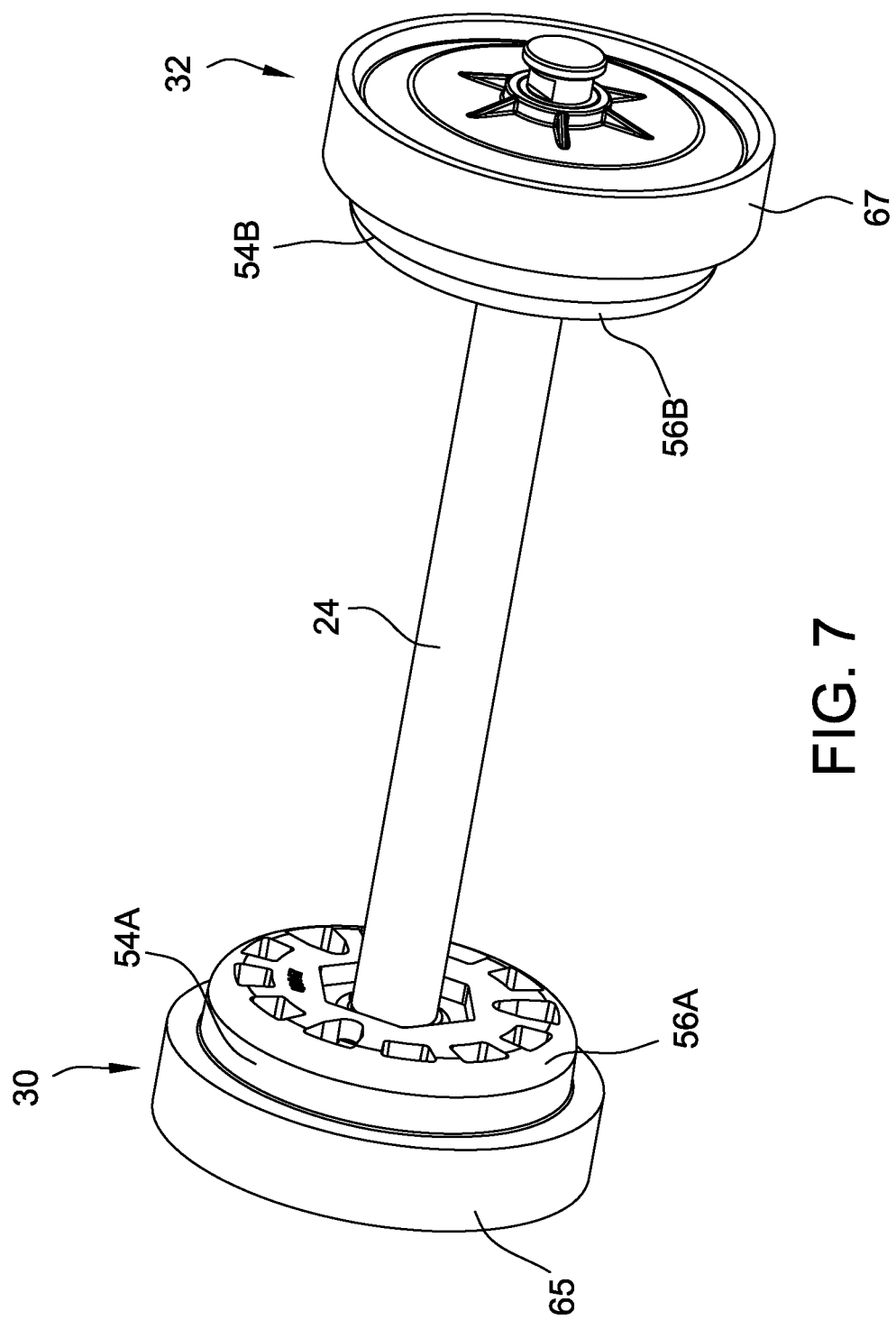
FIG. 7 is a perspective view of two bearing assembly end housings, end shields, and the shaft of the conveyer roller.

The first bearing assembly 30 contacts the center tube 14 at the first end 22A of the tube 14 and at the first shoulder 28A (FIG. 3). The second bearing assembly 32 contacts the center tube 14 at its second end 22B and at the second shoulder 28B (FIG. 6). As shown in FIG. 7, the first bearing assembly 30 includes a first collar 54A that abuts the first shoulder 28A and the second bearing assembly 32 includes a second collar 54B that abuts the second shoulder 28B. Each collar 54A, 54B includes a tapered portion 56A, 56B that facilitates press fitting of the end housings 65, 67 into the center tube 14 (FIG. 1) and spin welding of the tube to the end housings 65, 67. Each collar 54A, 54B contacts a corresponding ledge 55A, 55B (FIGS. 3 and 6) of the center tube 14. The weld between the housings 65, 67 and center tube 14 causes the center tube 14 to rotate with the end housings 65, 67. Friction between the first and second outer races 48, 58 and annular inner surfaces 52A, 52B of the housing collars 54A, 54B causes the end housings 65, 67 to rotate with the outer races 48, 58.

In the illustrated embodiment, the first bearing 40 is axially fixed with respect to the first end housing 65 and the second bearing is axially fixed with respect to the second end housing 67. The first bearing assembly 30 includes one or more barbs 35A (FIG. 3) and the second bearing assembly 32 includes one or more barbs 35B. The first bearing 40 is disposed between the first barbs 35A and an inner sidewall 37A of the first end housing 65. The second bearing 42 is disposed between the second barbs 35A and an inner sidewall 37B of the second end housing 67.

The conveyor roller 10 includes an elastic member 70 (FIG. 3) at least partially disposed between the inner race 44 of the first bearing 40 and the shaft 24 to allow the shaft 24 to move axially relative to the inner race 44. Generally, the elastic member 70 has a lower modulus of elasticity (i.e., Young's modulus) than the modulus of elasticity of the shaft 24 and/or inner race 44 of the first bearing. In this manner, a relatively consistent friction force between the inner surface of the first bearing 40 and the shaft 24 may be maintained such that the friction force is sufficiently great to prevent rotation between the first bearing 40 and the shaft 24 while allowing axial displacement of the first bearing 40 relative to the shaft 24 (e.g., displacement caused by differences in the coefficient of thermal expansion between the center tube 14 and shaft 24). In this arrangement, the first bearing 40 may move axially with the end housing 65 relative to the shaft 24 with rotation of the inner race 44 about the shaft 24 being constrained by the elastic member 70.

In the illustrated embodiment, the elastic member 70 is an o-ring. In other embodiments, the elastic member 70 is a strip or coating (e.g., urethane) that is disposed between the inner race 44 and the shaft 24. In some embodiments, the elastic member comprises polymer rolling elements disposed within slots in the shaft or inner race. In some embodiments, the elastic member is an outward acting spring clip that is preventing from rotating on the shaft (e.g., a metal spring clip captured within a circumferential groove on the shaft). The elastic member 70 may extend continuously around the circumference of the shaft 24 or partially around the shaft 24.

The elastic member 70 may be made of any material that has a modulus of elasticity less than the materials of the shaft and/or inner race 44 of the floating bearing 40. In some embodiments, the modulus of elasticity of the elastic member is no more than 80% of the modulus of elasticity of the shaft 24 and/or inner race 44 of the bearing 4, or no more than 65%, no more than 50%, no more than 33%, no more than 20%, no more than 10% or no more than 1%, or no more than 0.1% of the modulus of elasticity of the shaft 24 and/or inner race 44 (e.g., $1\times10^{-5}$% to about 80% of the elasticity or $1\times10^{-5}$% to about 1% of the modulus of elasticity of the shaft 24 and/or inner race 44). In some embodiments, the elastic member 70 (e.g., o-ring) is made of a polymer material (e.g., elastomer) such as rubber. Rubber (e.g., 90 durometer) may have a modulus of elasticity of about 3000 psi compared to steel which may have a modulus of elasticity of 29,000,000 psi (i.e., rubber may have a modulus of elasticity of ~0.01% of the modulus of elasticity of steel). These ranges are exemplary and should not be considered in a limiting sense unless stated otherwise.

Figure 5:
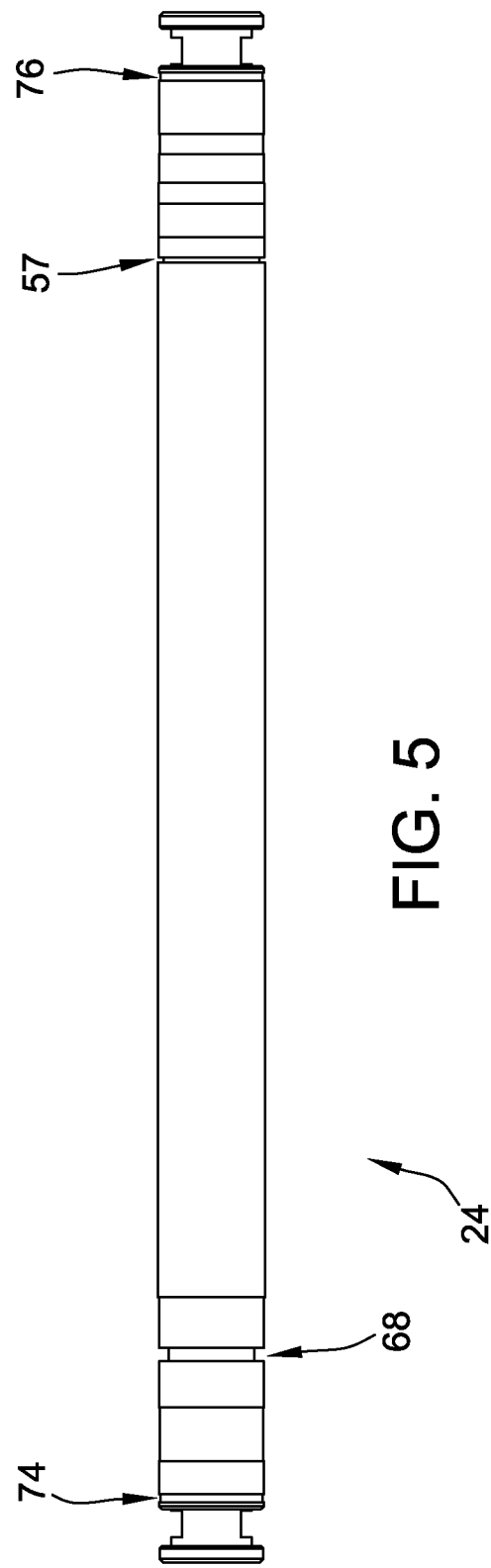
FIG. 5 is a front view of a shaft of the conveyor roller.

Referring now to FIG. 5, the shaft 24 includes a groove 68. The elastic member 70 (shown as an o-ring in FIG. 3) is at least partially received in the groove 68. In the illustrated embodiment, the groove 68 extends around the circumference of the shaft 24. The groove 68 may have a depth less than the thickness of the elastic member 70 in its non-deformed state. In some embodiments, the groove 68 has a width about equal to the thickness of the elastic member 70.

Generally, the bearing 40 is capable of moving axially with respect to the shaft 24. In some embodiments, the floating bearing assembly 32 does not include any fasteners or other devices or features for fixing the bearing 40 to the shaft 24 in the axial direction such as a set screw, push nut, retainer ring or a shoulder on the shaft.

The conveyor roller 10 includes first and second end shields 81A, 81B (FIGS. 3 and 6) that deflect foreign materials away from the roller 10. In the illustrated embodiment, the end shield 81A, 81B are separate from the first and second bearing assembly end housings 65, 67. The end shields 81A, 81B may include one or more barbs that fit within end shield grooves 74, 76 (FIG. 5) of the shaft 24. During assembly, the end shields 81A, 81B are pressed onto the shaft 24 until the one or more barbs are seated in the grooves 74, 76. In other embodiments, the end shields 81A, 81B are integral with the first and second end housing 65, 67 or are eliminated.

Each bearing assembly 30, 32 includes seal members 85A, 85B (FIGS. 3 and 6) that are external to the bearings 40, 42. The seal members 85A, 85B each include seal supports 89A, 89B that carry seals 90A, 90B (e.g., rubber seals). The seals 90A, 90B contact the shaft 24 and rotate about the shaft to reduce foreign material that contacts the first and second bearings 40, 42. Alternatively or in addition to contact seals, labyrinth seals that provide non-contact sealing action may be used. In some embodiments, the conveyor roller 10 does not include contact seals or labyrinth seals (i.e., does not include any auxiliary seal).

In some embodiments, the second bearing assembly 32 is fixed with respect to the shaft 24. Referring now to FIG. 6, the bearing assembly 32 includes a retaining ring 87 at the inner side 47 of the bearing 42 and a push nut 50 at the outer side 53 of the bearing 42. The retaining ring 87 is at least partially received in a groove 57 (FIG. 5) formed in the shaft 24. Together, the retaining ring 87 and push nut 50 limit axial movement of the bearing 42 relative to the shaft 24.

A rotational axis A extends through the center tube 14 and the shaft 24 and through the first and second bearing assemblies 30, 32. The center tube 14, first and second bearing assembly end housings 65, 67, and outer races 48, 58 of the bearings 40, 42 rotate about the shaft 24 and rotational axis A. The inner race 44, 56 and end shields 81A, 81B do not rotate during use. In other embodiments, the end shields 81A, 81B rotate.

The conveyor roller 10 may generally be made of any material suitable for use in conveying operations. In some embodiments, the conveyor roller 10 includes components that are made of dissimilar materials such as materials that expand at different rates during heating. For example, the shaft 24 may be made of a metal such as steel and the center tube 14 may be made of a polymer. Alternatively or in addition, the first and second bearing assembly end housings 65, 67 may be made of a polymer. Example polymers from which the center tube 14 and/or first and second bearing assembly end housings 65, 67 may be made include nylon and high-density polyethylene (HDPE).

In some embodiments, the center tube 14 (and optionally the first and second bearing assembly end housings 65, 67) has a coefficient of thermal expansion that is at least twice the coefficient of thermal expansion of the shaft 24 or at least 3 times or even 5 times the coefficient of thermal expansion of the shaft 24.

The conveyor roller 10 has a length L. In some embodiments, the roller 10 may have a length L in which differences in coefficients of thermal expansion may impact the performance of the conveyor roller, such as, for example, a length L of at least 20 inches, at least 36 inches, at least 48 inches or even at least about 72 inches or more.

The conveyor roller 10 may be assembled by spin welding the first and second end housings 65, 67 to the center tube 14. The retaining ring 87 and elastic member 70 are installed on the shaft 24. The shaft 24 is placed into the center tube 14. The first and second bearings 40, 42, push nut 50, first and second seal members 85A, 85B, and first and second end shields 81A, 81B are installed onto the shaft 24 by a press.

In some embodiments, rather than a shaft 24 that extends through the center tube, the conveyor roller 10 may include two stub shafts that extend partially in the center tube 14. An example stub shaft roller is shown and described in U.S. Pat. No. 5,022,132, which is incorporated herein by reference for all relevant and consistent purposes. The conveyor roller may include two bearings toward each end of the roller. An example of stub shaft assemblies having two bearings includes the stub shaft assemblies of the conveyor pulleys of U.S. patent application Ser. No. 15/597,945, filed May 17, 2017, entitled "Stub Shaft Conveyor Pulleys", which is incorporated herein by reference for all relevant and consistent purposes. Stub shaft rollers of embodiments of the present disclosure may include a floating bearing on each stub shaft and an elastic member at least partially disposed between each floating bearing and the corresponding stub shaft.

The conveyor rollers of embodiments of the present disclosure have several advantages over conventional conveyor rollers. Use of a first bearing assembly that is allowed to move axially relative to the shaft (i.e., float) allows the center tube and first and second bearing assembly end housings to more freely expand or contract relative to the shaft. In embodiments in which the center tube and/or first and second bearing assembly end housings are made of a different material than the shaft and are characterized by different coefficients of thermal expansion, changes in the ambient temperature (such as heating during the course of a day or temperature changes caused by changes in weather) that cause expansion or contraction of the center tube and/or first and second bearing assembly end housings relative to the shaft may be accommodated without inducing stress within the conveyor roller. This increases the lifetime of the conveyor roller and reduces roller replacement cost. This is particularly advantageous in embodiments in which the conveyor roller is relatively long (e.g., at least about 20 inches, at least about 36 inches, at least about 48 inches, at least about 72 inches or more). Even in rolls in which the tube and shaft have the same coefficient of thermal expansion, manufacturing methods and tolerance stack up of components may cause an axial preload of the bearings during assembly. This preload generally manifests itself as increased roll drag in newly manufactured rolls. The floating bearing reduces or eliminates the axial preload in such embodiments.

Use of an elastic member allows the inner race of the floating bearing to remain rotationally fixed with respect to the shaft (i.e., keeps the inner race from rotating) but allows the bearing to move axially upon imposition of a relatively strong axial force such as forces caused by thermal expansion of the center tube and/or first and second bearing assembly end housings relative to the shaft. The comparatively lower modulus of elasticity of the elastic member creates a relatively consistent friction force between the inner surface of the first bearing and the shaft to be maintained with the friction force being within a range great enough to prevent rotation between the bearing and the shaft while allowing axial displacement of the first bearing relative to the shaft (e.g., displacement caused by differences in the coefficient of thermal expansion between the center tube and shaft). Without being bound by any particular theory, to generate the same range of friction forces, use of a component with a lower modulus of elasticity relative to the shaft allows the range of interference between the elastic member and the bearing to be greater compared to steel on steel surfaces. This allows for greater tolerances to be used during manufacturing and reduces the incidence of manufacturing deviations causing too little or too much friction force between the inner surface of the bearing and the shaft.

In embodiments in which the elastic member is an o-ring, the o-ring allows for greater differences in the diameter of the shaft and the bearing bore without rotation of the inner race relative to the shaft which simplifies manufacturing (e.g., less precision between the bearing bore and shaft diameter is needed). The o-ring may also be deformable which allows the o-ring to exert an outer force on the bearing which also increases the contact surface between the elastic member and the bearing inner race. The o-ring also provides a seal between the bearing and shaft which prevents foreign material from becoming entrapped in the center tube chamber.

Use of a second bearing assembly that is axially fixed relative to the shaft allows the center tube to be properly located on the shaft (i.e., prevents or reduces movement of the tube relative to the shaft). The conveyor roller may be relatively simple to manufacture as the first and second bearings may be identical with the manufacturing difference being the floating bearing assembly and fixed bearing assembly being the presence and/or location of grooves within the shaft and the elastic member.

In embodiments in which the conveyor roller includes contact seals that are outboard to the bearings, the amount of foreign material that contacts the bearings may be reduced. In embodiments in which the bearings are sealed, the lifetime of the bearing may be reduced.

In embodiments in which the roller includes two stub shafts, use of a floating bearing and elastic member allows the roller to be mounted such that the ends of the stub shafts are fixed against a structure. The floating member allows the stub shafts to be displaced after installation due to changes in temperature.

In embodiments in which the center tube is made of a lower surface energy material such as HDPE, foreign material may be more easily shed from the surface.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the

What is claimed is:

1. A conveyor roller comprising:
   a shaft;
   a floating bearing assembly, the floating bearing assembly being a first bearing assembly and comprising a bearing having:
      an inner race through which the shaft extends;
      an outer race disposed around the inner race; and
      one or more rolling elements disposed between the inner race and outer race to enable the outer race to rotate relative to the inner race;
   an elastic member disposed between the inner race and the shaft to resist movement of the inner race relative to the shaft;
   a second bearing assembly that is axially fixed relative to the shaft; and
   a center tube having an outer circumferential surface, the shaft being received in the center tube, the first and second bearing assemblies enabling the center tube to rotate relative to the shaft.

2. The conveyor roller as set forth in claim 1 wherein the elastic member is an O-ring, strip, or coating.

3. The conveyor roller as set forth in claim 1 wherein the elastic member is an o-ring.

4. The conveyor roller as set forth in claim 3 wherein the shaft comprises a groove, the o-ring being at least partially received in the groove.

5. The conveyor roller as set forth in claim 1 wherein the elastic member has a modulus of elasticity that is no more than 50% of the modulus of elasticity of the shaft and no more than 50% of the modulus of elasticity of the inner race.

6. The conveyor roller as set forth in claim 1 wherein the shaft is a through-shaft that extends through the first bearing assembly and the second bearing assembly.

7. The conveyor roller as set forth in claim 1 further comprising a seal member external to the bearing for reducing foreign material that enters the bearing.

8. The conveyor roller as set forth in claim 1 wherein the center tube is made of a polymer and the shaft is made of steel.

9. A conveyor roller comprising:
   a shaft that defines a rotational axis;
   a floating bearing assembly that is free of fasteners that limit movement of the floating bearing assembly relative to the shaft in an axial direction, the floating bearing assembly being capable of moving relative to the shaft in the axial direction, the floating bearing assembly being a first bearing assembly and comprising a first bearing having:
      an inner race through which the shaft extends;
      an outer race disposed around the inner race; and
      one or more rolling elements disposed between the inner race and outer race to enable the outer race to rotate relative to the inner race;
   a second bearing assembly comprising a second bearing, the second bearing being fixed relative to the shaft in the axial direction; and
   a center tube having an outer circumferential surface, the shaft being received in the center tube, the center tube rotating relative to the shaft about the rotational axis.

10. The conveyor roller as set forth in claim 9 wherein the inner race has an inner surface, the inner surface being in contact with an elastic member.

11. The conveyor roller as set forth in claim 10 wherein the elastic member is an O-ring, strip, or coating.

12. The conveyor roller as set forth in claim 10 wherein the elastic member is an o-ring.

13. The conveyor roller as set forth in claim 9 further comprising a seal member external to the bearing for reducing foreign material that contacts the bearing.

14. The conveyor roller as set forth in claim 9 wherein the center tube is made of a polymer and the shaft is made of steel.

15. The conveyor roller as set forth in claim 9 wherein (1) the conveyor roller is used to support a belt or (2) the conveyor roller is used to change a direction of a belt.

16. A conveyor roller comprising
   a shaft that defines a rotational axis, the shaft being made of steel;
   a first bearing assembly that is capable of moving relative to the shaft in an axial direction;
   a second bearing assembly that is fixed relative to the shaft in the axial direction; and
   a center tube having an outer circumferential surface, the shaft being received in the center tube, the center tube being made of a polymer, the center tube rotating relative to the shaft about the rotational axis.

17. The conveyor roller as set forth in claim 16 wherein:
   the first bearing assembly comprises a first bearing having an inner race having an inner surface, the roller comprising an elastic member in contact with the inner surface of the bearing; and
   the second bearing assembly comprises a second bearing, the second bearing not contacting an elastic member.

* * * * *